United States Patent
Hatakeyama et al.

(10) Patent No.: US 7,045,257 B2
(45) Date of Patent: May 16, 2006

(54) BLACK MATRIX AND METHOD FOR MANUFACTURING THE SAME

(75) Inventors: Akira Hatakeyama, Shizuoka-ken (JP); Hidenori Gotoh, Shizuoka-ken (JP); Hideaki Ito, Shizuoka-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/825,420

(22) Filed: Apr. 16, 2004

(65) Prior Publication Data

US 2004/0209184 A1    Oct. 21, 2004

(30) Foreign Application Priority Data

Apr. 18, 2003    (JP) .............................. 2003-113613

(51) Int. Cl.
*G02B 5/20*    (2006.01)

(52) U.S. Cl. .......................... 430/7; 427/162; 427/164

(58) Field of Classification Search .................... 430/7, 430/321; 349/110; 427/162, 164, 508, 510, 427/511, 514

See application file for complete search history.

(56) References Cited

U.S. PATENT DOCUMENTS 5,631,753 A * 5/1997 Hamaguchi et al. ........ 349/110
5,686,980 A * 11/1997 Hirayama et al. .......... 349/110
2004/0157141 A1* 8/2004 Ito ................................. 430/7

FOREIGN PATENT DOCUMENTS

JP    62-9301 A    1/1987
JP    5-303090 A   11/1993

OTHER PUBLICATIONS

Semiconductor Equipment and Materials International, "Color TFT Liquid Crystal Display", pp. 218-220, published by Kyoritsu Shuppan Co., Ltd., Jul. 20, 1996.

* cited by examiner

*Primary Examiner*—John A. McPherson
(74) *Attorney, Agent, or Firm*—Sughrue Mion, PLLC

(57) ABSTRACT

The present invention provides a black matrix containing metal fine particles, wherein the volume fraction of the metal fine particles is in a range from 0.05 to 0.70. The volume fraction is preferably is in a range from 0.10 to 0.55, and more preferably in a range from 0.2 to 0.50. The invention also provides a method of manufacturing the black matrix. The method is preferably a method comprising: forming a recording material having a layer formed by applying and drying a coating liquid containing metal fine particles on a temporary support; and transferring the layer onto a substrate. Further, the invention also provides a method comprising the step of applying onto or above the substrate the coating liquid containing the metal fine particles and then drying the coating liquid. In each of the methods, the coating liquid can have photosensitivity.

14 Claims, No Drawings

BLACK MATRIX AND METHOD FOR MANUFACTURING THE SAME

CROSS-REFERENCE TO RELATED APPLICATIONS

This application claims benefit of and priority to Japanese Patent Applications No. 2003-113613, filed on Apr. 18, 2003, which is incorporated herein by reference in their entirety for all purposes.

BACKGROUND OF THE INVENTION

1. Field of the Invention

The present invention relates a black matrix used for a color filter used for a liquid crystal display device or the like and a method for manufacturing the same.

2. Description of the Related Art

A black matrix is a black edge formed on the circumferences of the red, blue and green pixels of a color filter so as to prevent the leaking of light.

In a color filter used for a color liquid crystal display or the like, colored pixel layers (R, G, B) are formed on a transparent substrate, and in order to secure an improvement in display contrast or the like, black matrices are formed in gaps between the colored pixels, R, G, B (red, green, blue). Especially, in an active matrix driving type liquid crystal display device using thin film transistors (TFT), a black matrix having a high light-shielding property (optical density) is required so as to prevent a deterioration in image quality as a result of leakages of current caused by the light of the thin film transistors.

It is possible to use metal to manufacture a black matrix having a high light-shielding property. As technique for manufacturing a black matrix with metal fine particles, a plating technique for forming nickel fine particles in a layer has already been disclosed (see Japanese Patent Application Laid-Open (JP-A) No. 5-303090).

This method, however, has drawbacks, such as complications in precipitating fine particles from a plating solution containing metal ions, complications in the disposal of the waste solution, and many other environmental considerations.

On the other hand, a method of manufacturing a black matrix without using the plating technique is also known, for example, a black matrix formed by using carbon black instead of metal fine particles (see JP-A No. 62-9301).

However, since carbon black has lower optical density per unit of coating amount than that of metal fine particles, if a high light-shielding property and high optical density need to be secured, the film thickness inevitably increases, and once the black matrix has been formed it becomes difficult to form uniform red, blue, and green pixels.

Among additional ways of forming a black matrix by means of a plating technique, a following according to which a metal film such as a chrome film is used as a shading layer and, a thin metal film is then formed by a deposition method or by a sputtering method. A photo resist is then applied on the thin metal film, the photo resist layer is then exposed and developed with the use of a photo mask having patterns for a black matrix, and the thin metal film is exposed and then etched. Finally, the resist layer remaining on the thin metal film is exfoliated, and a black matrix is thereby formed (For example, see "*Color TFT liquid crystal display*" PP. 218–220, published by Kyoritsu Shuppan Co., Ltd. (Jul. 20, 1996)).

Since a thin metal film is used in this method, a high shading effect can be obtained even when the thickness of the metal film is minimal, however, when a vacuum film deposition process, such as a deposition method or a sputtering method, or an etching process become necessary, problems arises insofar that costs become higher and the burden on the environment can not be lightly dismissed. Moreover, since a metal film invariably has high reflectivity, another problem has been that display contrast is poor in conditions of strong external light. In contrast, another method is to use a low reflection chromium film (a laminated body or the like composed of two layers, a metal chrome layer and an oxidation chrome layer). However, in this case it can not be denied that cost become even higher.

Further, the hue or the reflectivity of a black matrix containing metal fine particles may be changed as a result of exposure to high temperatures during manufacture, and bubbles may be caused. Thus there is a need in the art for forming an improved black matrix for a liquid crystal display.

Furthermore, additional ways of forming a black matrix containing metal sulfide fine particles by means of a plating technique are known (for example, see JP-A No. 7-218715). However, since these methods also use a plating technique, they need environmental considerations about waste solution and complications in processings. Therefore, these methods are not satisfying, too.

SUMMARY OF THE INVENTION

The present invention has been accomplished in response to the problems described above.

The invention provides a thin black matrix which has a high light-shielding performance and can be manufactured at a low cost, and in which no hue or the like is not affected by heat treatment during manufacture.

The present inventors have conducted studies in the light of the aforementioned problems, and have discovered that the problems can be solved by setting the volume fraction of the metal fine particles in a black matrix within a specific range. The invention was accomplished based on this finding.

That is, the invention provides a black matrix containing metal fine particles, wherein a volume fraction of the metal fine particles is in a range from 0.05 to 0.70.

The invention further provides a method for manufacturing the above-described black matrix comprising: forming a recording material having a layer and a temporary support, wherein the layer is formed by applying and drying a coating liquid containing the metal fine particles on the temporary support; and transferring the layer onto a substrate.

In addition, the invention provides a method for manufacturing the black matrix comprising applying and drying a coating liquid containing the metal fine particles on or above a substrate.

DETAILED DESCRIPTION OF THE INVENTION

The present invention provides a black matrix and methods for manufacturing thereof. The black matrix contains metal fine particles, wherein a volume fraction of the metal fine particles is in a range from 0.05 to 0.70 the same.

Hereinafter, the black matrix and the method for manufacturing the same will be described in detail.

Metal Fine Particles

The metal fine particles used in the invention are not limited to a particular metal. Examples of the metals include nickel, silver, gold, platinum, copper or alloy thereof. Silver is preferable in view of chemical stability and cost.

The composition of the metal fine particles used in the invention may be uniform or nonuniform. Examples of the nonuniform compositions include a composition wherein a coating layer made of the composition different from the inside is formed on the surface. The metal fine particles used in the invention are not limited to a particular shape, and the metal fine particles having various shape such as sphere, indeterminate form, tabular, cube, regular octahedron and pillar shape can be used.

An average particle diameter of the metal fine particles used in the invention is preferably in a range from 1 to 3000 nm, and more preferably in a range from 10 to 250 nm. When the average particle diameter is less than 1 nm, the absorption wavelength becomes shorter. When the average particle diameter is in excess of 3000 nm, the color may be disadvantageously generated and the optical density may be disadvantageously decreased.

A method for manufacturing the metal fine particles used in the invention is not particularly restricted. A known method for manufacturing, for example, a gas phase method such as an evaporation cohesion method and a vapor phase reduction method, and a liquid-phase method such as a liquid phase reduction method can be adopted. The methods are described in "Leading-edge Trend II in Technology of Ultrafine Particle and Application", published by S.B. TECHNO-RESEARCH CO., LTD., 2002 in detail.

Examples of known methods for preparation of silver fine particles (colloid silver) include: a method disclosed in U.S. Pat. No. 2,688,601, wherein soluble silver salts are reduced by hydroquinone in a gelatin aqueous solution; a method described in German Patent (DE) No. 1,096,193, wherein hardly soluble silver salts are reduced by hydrazine; a method in which silver ions are chemically reduced in a solution like a method described in U.S. Pat. No. 2,921,914, wherein silver is reduced by tannic acid; a method described in JP-A No. 5-134358, wherein silver particles are formed by an electroless plating; and a gas-in evaporation method, wherein bulk metal is evaporated in inert gas such as helium and the bulk metal evaporated is cold-trapped by a solvent.

Volume Fraction

The black matrix of the invention contains a polymer, a monomer, a polymerization initiator and an arbitrary component other than the above components as a binder other than the metal fine particles. A portion of the components may disappear in steps of applying, developing and heat-drying or the like while manufacturing the black matrix. Therefore, in the invention, "volume fraction of the metal fine particles" means the volume fraction of the metal fine particles in the film when the black matrix is formed.

For example, the volume fraction of the silver fine particles is calculated according to the following equation.

Volume fraction of the silver fine particles=(Coating amount of silver/10.5)/film thickness The coating amount of the silver is expressed in $g/m^2$. The numerical value 10.5 is the density of the silver expressed in $g/m^3$. Therefore, the value of [Coating amount of silver/ 10.5] corresponds with the value in which the thickness of the silver is expressed in μm when the silver is coated as a uniform film. The film thickness is expressed in μm.

In the invention, the volume fraction of the silver fine particles is in a range from 0.05 to 0.70 in the black matrix. The volume fraction is preferably in a range from 0.10 to 0.55, and more preferably in a range from 0.2 to 0.50. When the volume fraction is less than 0.05, the thickness of the black matrix is increased, and thereby a drawback exists in that resulted red, blue and green pixels become nonuniform. When the volume fraction is in excess of 0.70, hue change is disadvantageously caused at the time of being preserved at high temperatures.

The thickness of the black matrix of the invention is preferably 0.9 μm or less, more preferably 0.6 μm or less, and far more preferably 0.4 μm or less. The optical density (OD) of the invention is preferably 3.3 or more, and more preferably 3.5 or more.

The swelling degree S of the black matrix of the invention with water is preferably 0.5 or less. In the invention, the swelling degree S is defined by the following equation:

$$S=(?d-d)/d$$

In the above equation, "d" denotes a dried film thickness, and "?d" denotes a thickness of a film swelled with water for 60 seconds at 25° C.

The black matrix of the invention can be manufactured by a method which includes applying and drying a coating liquid containing the metal fine particles on or above a substrate, or a method which includes forming a recording material having a layer and a temporary support, wherein the layer is formed by applying and drying a coating liquid containing the metal fine particles on the temporary support, and transferring the layer onto a substrate.

Coating Liquid Containing Metal Fine Particles

A coating liquid used in the invention may contain metal fine particles, and further may contain a polymer and a solvent or the like as a binder.

Binder

The following describes the binder.

Examples of the binder contained in the light shielding film of the invention is the following:

polyvinyl alcohol, gelatin, cellulose type polymers such as methyl cellulose, and acrylic and styrene acrylic polymers obtained by polymerizing methyl methacrylate, ethyl acrylate, benzyl acrylate, acrylic acid, methacrylic acid, styrene, or the like.

Of these examples, acrylic and styrene acrylic polymers which contain an acrylic acid or methacrylic acid moiety and are soluble in alkali are preferable since the polymers can be patterned by alkali development.

In any one of these polymers, the content of the total of acrylic acid and methacrylic acid in the polymer is from 10 to 60% by mass, more preferably from 20 to 50% by mass.

Specific examples of the polymers include benzyl methacrylate/methacrylic acid (60/40, this ratio is the ratio by mass therebetween. The same matter is correspondingly applied to the following.); methyl methacrylate/styrene/ methacrylic acid (10/60/30); methyl methacrylate/styrene/ acrylic acid/methacrylic acid (20/50/15/15); benzyl methacrylate/methyl methacrylate/methacrylic acid (30/35/35); and styrene/acrylic acid/methacrylic acid (60/20/20).

The binder may be a monomer or an oligomer. It is preferable to use a polyfunctional acrylic monomer, specific examples of which include ethylene glycol (meth)acrylate, triethylene glycol di(meth)acrylate, 1,3-butanediol di(meth) acrylate, tetramethylene glycol di(meth)acrylate, propylene glycol di(meth)acrylate, trimethylolpropane tri(meth)acrylate, 1,4-hexanediol di(meth)acrylate, pentaerythritol hexa (meth)acrylate, and dipentaerythritol hexa(meth)acrylate.

These polyfunctional monomers can be crosslinked using light or heat, as described above. In this method, it is preferable to photopolymerize the monomer using, as a polymerization initiator, a halomethyl-S-triazine compound such as bis[4-[N-[4-(4,6-bistrichloromethyl-S-triazine-2-yl) phenyl]carbamoyl]phenyl]cebacate.

In order to improve the dispersion stability of the fine particles of the invention, a polymer may be added to the light shielding film of the invention. Examples of the polymer (the so-called dispersing agent) include polyvinyl alcohol, acrylamide/acrylic acid copolymer, styrene/maleic anhydride copolymer, sodium polyacrylate, and sodium alginate. As the dispersing agent, for example, the following can also be used: agents described in "*Pigment Dispersing Technique*" (Technical Information Institute Co., Ltd.) published by Kazuhiro Takausu in 1999. of these pigments, hydrophobic agents are particularly preferable.

Solvents

Known organic solvents can be used in the invention. Examples of particularly preferable organic solvents include methyl alcohol, isopropyl alcohol, MEK, ethyl acetate and toluene. Water is also used as a preferable solvent. The solvents may be used in the combination thereof if necessary.

Substrate

It is preferable that the substrate is a glass substrate used for a liquid crystal display device or the like. Examples of the glass substrate include known glasses such as a soda glass, a low alkali glass and a non-alkali glass. A thickness of the substrate is preferably in a range from 0.5 to 3 mm, more preferably in a range from about 0.6 to about 2 mm. Glass substrates, described in for example, "*Liquid crystal display engineering introduction*" (Hanani Suzuki, published by The Nikkan Kogyo Shimbun, Ltd., 1998), can be used.

Metal Fine Particles-Containing Coating Liquid which having Photosensitivity

The coating liquid which contains the metal fine particles of the invention may have photosensitivity. To impart photosensitivity to the coating liquid, a photosensitive resin composition is added. Examples of the photosensitive resin composition include those described in paragraphs 0016 to 0022 and a paragraph 0029 in JP-A No. 10-160926.

When the metal fine particles are used as an aqueous dispersion like the silver colloid, an aqueous photosensitive resin composition is necessary. Examples of the photosensitive resin composition include those described in paragraphs 0015 to 0023 in JP-A No. 8-271727, and additionally, commercially available ones such as "SPP-M20" (trade name, manufactured by Toyo Gosei Co., Ltd.).

Method for Manufacturing the Black Matrix

One method for manufacturing the black matrix of the invention comprises applying and drying the coating liquid containing the metal fine particles on or above the substrate.

A method for forming the pattern of the black matrix is not particularly restricted.

Hereinafter, examples of the methods for forming the pattern are described.

(1) A photosensitive coating liquid containing metal fine particles is applied on a substrate and thereby a shading layer (a layer containing the metal fine particles) is formed. Then, patterns are formed by removing non-pattern part of the shading layer by exposure development.

(2) A non-photosensitive coating liquid containing metal fine particles is applied on a substrate and a shading layer is formed. Then, a photosensitive resist liquid is applied thereon, and a resist layer is formed. Then, after patterns are formed on the resist layer by exposure development, a non-pattern part of the shading layer below the patterns is dissolved according to the patterns and the patterns are formed on the shading layer. Finally, the resist layer is removed, and thereby a black matrix is formed.

(3) A coating layer is formed on the part other than patterns of a substrate beforehand. A non-photosensitive coating liquid containing metal fine particles is applied thereon, and a shading layer is formed. Then, the coating layer formed originally and the shading layer formed thereon are removed.

In the invention, the method for applying to the substrate is not limited to a particular method, and examples of the method include a spin coat method described in JP-A No. 5-224011, a curtain coat method, an extrusion method, and a die coat method described in JP-A No. 9-323472.

In the spin coat method, a coating liquid is dropped on a rotating substrate, and the liquid is spread by centrifugal force.

The curtain coat method is called a flow coat method, and is a kind of slot orifice coating methods. In the method, a coating liquid is dropped in a curtain shape from a slit, and is spread on a substrate. The coating liquid is spread on the substrate by the movement of the slit or the substrate in the horizontal direction, and thereby a uniform thin film is formed.

The extrusion method is called an extrusion coat method, and the coating liquid extruded from the slit is directly spread on a moving substrate.

The coating methods are described in, for example, "*Coating Technology*" (Yuzi Harazaki supervision, published by United Engineering Center Inc., 1983) in detail.

A light source used for exposure is selected according to the photosensitivity of a photosensitive resin layer having light-shielding property. For example, a known light source such as a ultrahigh pressure mercury lamp, a xenon lamp, a carbon arc lamp and an argon laser can be used. An optical filter whose optical transmittance of the wavelength of 400 nm or more is 2% or less may be used as described in JP-A No. 6-59119.

A diluted aqueous solution of an alkaline substance is used as a developer. Further, a developer in which a small amount of an organic solvent being miscible with water is added may be used. Examples of the suitable alkaline substances include alkali metal hydroxides (for example, sodium hydroxide, potassium hydroxide), alkali metal carbonates (for example, sodium carbonate, and potassium carbonate), alkali metal bicarbonates (for example, sodium hydrogen carbonate, potassium hydrogen carbonate), alkali metal silicates (for example, sodium silicate, potassium silicate), alkali metal metasilicates (for example, sodium metasilicate, potassium metasilicate), triethanolamine, diethanolamine, monoethanolamine, morpholine, tetraalkyl ammonium hydroxydos (for emample, tetramethyl ammonium hydroxydo) and trisodium phosphate. The concentration of the alkaline substance is preferably in a range from 0.01 to 30% by weight, and the pH of the alkaline substance is preferably is in a range from 8 to 14. According to the nature such as the oxidation of the photosensitive resin layer having light-shielding property according to the invention or the like, for example, development due to membranous desorption of the invention can be performed by changing pH or the like of the developer.

Examples of suitable organic solvents which are miscible with the water include methanol, ethanol, 2-propanol, 1-propanol, butanol, diacetone alcohol, ethylene glycol monomethyl ether, ethylene glycol monoethyl ether, ethylene glycol mono-n-butylether, benzyl alcohol, acetone, methyl ethyl ketone, cyclohexanone, ε-caprolactone, γ-butyrolactone, dimethylformamide, dimethylacetamide, hexamethylphosphoramide, ethyl lactate, methyl lactate, ε-caprolactam, and N-methyl pyrolidone. The concentration of the organic solvent which is miscible with the water is generally in a range from 0.1 to 30% by weight.

Further, a known surfactant can be added to the developer. The concentration of the surfactant is preferably in a range from 0.01 to 10% by weight.

The developer can be used as a bath liquid or a spray liquid. For the removal of a uncured part of a photosensitive resin composition layer having light-shielding property in a solid shape (preferably is a film shape), a method wherein the uncured part is rubbed by a rotating brush or a moist sponge or the like in a developer, or a method wherein atomizing pressure is used when the developer is sprayed is preferable. It is preferable that the temperature of the developer is generally in a range from the vicinity of room temperature to 40° C. Also, washing may be performed after development.

Drying Step

Heat-drying is performed after developing. That is, a support which has a resin layer (hereinafter, referred to as "photo-cured resin layer") optically cured by exposure is heated in an electric furnace and a drying oven or the like, or the photo-cured resin layer is irradiated with an infrared lamp and is heated. A temperature and a time required for heating depend on the composition of the polymerizable composition used and the thickness of the layer formed, and the photo-cured resin layer is preferably heated in a range from about 120 to about 250° C. for about 10 to about 300 minutes generally so as to acquire enough resistance to solvents and alkali resistance.

Method Using Transferring

The black matrix of the invention may be manufactured by a method which uses a recording material (hereinafter referred to as "photosensitive transferring material") having a layer and a temporary support, wherein the layer is formed by applying and drying a coating liquid containing the metal fine particles on the temporary support, and transferring the layer onto a substrate.

A layer (that is, a photosensitive shading layer) manufactured from the coating liquid containing metal fine particles which has photosensitivity, is formed on the temporary support. The film thickness of the photosensitive shading layer is in a range from about 0.3 to 2.0 µm.

It is preferable that the temporary support is chemically and thermally stable and is composed of a flexible substance. Specifically, the temporary support is preferably a thin sheet made of TEFLON®, polyethylene terephthalate, polyethylene naphthalate, polyacrylate, polycarbonate, polyethylene or polypropylene, or made up of laminates selected from the group consisting thereof. When an alkali-soluble thermoplastic resin layer is formed, it is preferable that the temporary support has excellent peeling property from the resin layer. A suitable thickness is in a range from 5 to 300 µm, and preferably in a range from 20 to 150.

It is preferable that an alkali-soluble intermediate layer is disposed between the temporary support and the photosensitive shading layer.

Alkali-Soluble Intermediate Layer

The resin composing the intermediate layer is not limited to a particular resin as long as the resin is alkari-soluble. Examples of the resins include polyvinyl alcohol resin, polyvinylpyrrolidone resin, cellulose resin, acrylamide resin, polyethylene oxide resin, gelatin, vinylether resin, polyamide resin, and copolymer thereof. Also, an alkali-soluble resin obtained by copolymerizing a monomer having a carboxyl group and a sulfonic group with an alkali-insoluble resin like polyester can be used.

Polyvinyl alcohol is preferable among them. A saponification degree of the polyvinyl alcohol is preferably 80% or more, and more preferably in a range from 83 to 98%.

It is preferable that two or more kinds of resins are used in combination in the intermediate layer, and it is more preferable that polyvinyl alcohol and polyvinylpyrrolidone are used in combination. It is preferable that poly vinylpyrrolidone:polyvinyl alcohol is in a range from 1:99 to 75:25 as mass ratio, and more preferably in a range from 10:90 to 50:50. When the mass ratio is less than 1:99, the deterioration in a condition of the surface of the intermediate layer and the failure of adhesion of the photosensitive layer to the intermediate layer are caused in some cases. When the mass ratio is in excess of 75:25, oxygen impermeability of the intermediate layer may decrease to cause deterioration in sensitivity.

Various additives, such as a surfactant, are added to the intermediate layer if necessary.

A thickness of the intermediate layer is preferably in a range from 0.1 to 5 µm, and more preferably in a range from 0.5 to 3 µm. When the above thickness is less than 0.1 µm, the oxygen impermeability may be decreased. When the above thickness is in excess of 5 µm, the time for the removal of the intermediate layer may be increased at the time of developing.

A coating solvent of the intermediate layer is not limited to a particular solvent if the above resin can be dissolved in the coating solvent. It is preferable that water is used as the coating solvent and a mixture solvent in which water is mixed with the above water miscible organic solvent is used. Examples of the coating solvents of the intermediate layer include water and mixture solutions including such as water: methanol=90:10, water:methanol=70:30, water:methanol=55:45, water:ethanol=70:30, water:1-propanol=70:30, water:acetone=90:10, water:methyl ethyl ketone=95:5 (the ratios are shown in mass ratios).

Since the photosensitive shading layer made from the above coating liquid containing metal fine particles is provided, a thin black matrix, which is provided with the shading layer having the high optical density, can be manufactured in the present invention.

An optical density is preferably set to 1 or more per 1 µm of the film thickness of the shading layer in the black matrix of the invention. The black matrix of the invention has a shading layer manufactured by using a coating liquid containing metal fine particles. The film thickness of the shading layer is preferably in a range from about 0.3 to about 2.0 µm. The shading layer in the black matrix obtained by the invention is the layer in which metal fine particles are dispersed. Accordingly, even though the shading layer is a thin film, the shading layer has enough optical density.

In the invention, forming a protective layer on the shading layer may be performed after forming the shading layer and before exposing. The protective layer is formed so as to block oxygen and improve sensitivity when exposed. Therefore, it is preferable that the protective layer is the layer mainly composed of resin having oxygen impermeability, such as polyvinyl alcohol. After the black matrix is formed, the protective layer is removed by development since the protective layer is unnecessary.

EXAMPLES

Based on examples according to the present invention, the invention will be explained in further details. However, the invention should not be limited thereto.

Example 1

Preparation of the Silver Fine Particles

Production of the Silver Dispersed Slurry

To 112 g of gelatin, 3.488 g of distilled water was added, and the gelatin was dissolved by heating the mixture obtained up to about 47° C. To the mixture, 4.0 g of calcium acetate and 2.0 g of borohydride potassium were added. Immediately, 6.0 g of silver nitrate dissolved to 1.0 L of distilled water was added to the mixture while rapidly stirred. Distilled water was added to the mixture, and thereby the product of 5.0 kg of the final weight was prepared. The product was then cooled close to gel temperature. The product was then made to pass through tiny holes, and was then added to cooled water. Therefore, very minute noodles were formed. The noodles were supplied as an amplification catalyst for generating blue silver on site. Conveniently, the noodles were diluted at a ratio of water/noodle=1/3 by using the water so as to prevent the noodles from forming melted mass.

To 650 g of borohydride reduction silver nucleus, 6.5 g of mono sulfonic acid hydroquinone potassium and 0.29 g of KCl dissolved in 81 g of distilled water were added. The noodle slurry was cooled to about 6° C. Two kinds of solutions A, B having the following compositions were manufactured in two separate containers.

| Solution A | |
|---|---|
| Sodium sulfite (anhydrous) | 19.5 g |
| Sodium bisulfite (anhydrous) | 0.98 g |
| Distilled water | 122.0 g |
| Solution B | |
| Silver nitrate | 9.75 g |
| Distilled water | 122.0 g |

The solution A and the solution B were mixed, and white precipitation which disappears when keeping stirring was formed. Then, the mixture was immediately added to the noodle slurry while rapidly stirred in a short time (within at 5 minutes) Amplification was progressed at 10° C. for about 80 minutes until all the soluble silver salts were reduced on the nucleus. Since the blue slurry particles put in a nylon mesh bag were passed through the slurry in tap water and were washed such that wash water was passed the bag for about 30 minutes, all the salts can be flushed. The washed blue silver dispersed in the gel slurry was drained until the weight of the product is set to 412 g so as to obtain the blue silver dispersed body having the silver of the density of 1.5% by weight when melted.

Preparation of Silver Fine Particles

To 5000 g of the silver dispersed slurry obtained through the above method, 25 g of a dispersing agent (trade name: Pyrazole B-90, manufactured by Nippon Oils & Fats Co., Ltd.) and 1000 g of an aqueous solution containing 5% by weight papain were added, and the aqueous solution obtained was preserved for 24 hours at 37° C. The solution was centrifuged at 2000 rpm for about 5 minutes, and the silver fine particles were subsided. After the supernatant liquid of the solution was removed, the solution was washed by distilled water, and gelatin hydrolysate decomposed by enzyme was removed. Then, the sediment of the silver fine particle was washed in methyl alcohol, and the sediment was dried. About 85 g of the agglomerate of the silver fine particle was obtained. 73.5 g of the agglomerate, 1.05 g of the dispersed agent (trade name: Solsperse 20000, manufactured by Avecia Corporation) and 16.4 g of methyl ethyl ketone were mixed.

To the mixture, 100 g of the glass beads of 2 mm was mixed, and the mixture obtained was dispersed by a paint shaker for about 3 hours, thereby obtaining a silver fine particles dispersed liquid A-1.

Preparation of the Shading Layer Coating Liquid

The following components were added to and mixed with the silver fine particles dispersed liquid A-1, and thereby a shading layer coating liquid was obtained.

| Silver fine particles dispersed liquid A-1 | 40.0 g |
|---|---|
| Propylene glycol monomethyl ether acetate | 40.0 g |
| Methyl ethyl ketone | 37.6 g |
| Surfactant (trade name: MEGAFAC F176PF, manufactured by Dainippon Ink And Chemicals, Incorporated, 20%) | 0.2 g |
| Hydroquinone monomethyl ether | 0.001 g |

Dipentaerithritol Hexaacrylate
  the amount set to the volume fraction of Table 1, 2

| Bis[4-N-[4-(4,6-bistrichloromethyl-s-triazine-2-yl)phenyl]carbamoyl]phenyl]sebacate | 0.1 g |
|---|---|
| Preparation of the protective layer coating liquid | |
| Polyvinyl alcohol (trade name: PVA205, manufactured by Kuraray Co., Ltd.) | 3.0 g |
| Polyvinylpyrrolidone (trade name: PVP-K30, manufactured by GAF corporation) | 1.3 g |
| Distilled water | 50.7 g |
| Methyl alcohol | 45.0 g |

The components were mixed, and thereby a protective layer coating liquid was obtained.

Application of the Coating Liquid

The shading layer coating liquid was applied on a glass substrate by using a spin coater such that the optical density is set to 3.6, and was dried at 100° C. for 5 minutes. The protective layer coating liquid was then applied thereon by a spin coater such that the dried film thickness is set to 1.5 µm, and was dried at 100° C. for 5 minutes.

Exposure and Development

The application surface side is exposed to light in 70 mJ/cm$^2$ exposure light quantity by using a ultrahigh pressure mercury lamp. Then, the development processing was performed by using an alkali developer (trade name: development processing liquid TCD, manufactured by Fuji Photo Film Co., Ltd.) at 33° C. for 20 seconds, and thereby a black matrix was obtained.

The black matrix obtained was measured and evaluated in the following manner.

Film Thickness Measurement

The film thickness was measured in the following method. The sample on which the shading layer was applied was exposed to light in 70 mJ/cm² exposure light quantity from the application surface side by using a ultrahigh pressure mercury lamp, and the film thickness of the sample was measured by a tracer type surface roughness gauge (trade name: P-1, manufactured by TENKOP company).

Swelling Degree Measurement

The sample used in the film thickness measurement was dipped into distilled water for 60 seconds at 25° C., wiped to remove remaining water on its surface, and the thickness of the swelled film (?d) was measured in the same manner as described above. The swelling degree S (S=(?d−d)/d) was then calculated from the obtained dried film thickness (d) and the dried film thickness (d) to result in 0.05.

Measurement of the Volume Fraction

First, the coating amount of silver fine particles was measured in the following method.

The sample on which the photosensitive layer was applied is exposed to light in 70 mJ/cm² exposure light quantity from the application surface side by using a ultrahigh pressure mercury lamp, and the coating amount of silver fine particles of the sample was measured by a fluorescent X-ray device (trade name: 3370E, manufactured by Rigaku Corporation).

The volume fraction was calculated in the method described above by using the measured value and the film thickness measured in the above method (Film thickness measurement).

Measurement of the Optical Density

The optical density of the film was measured in the following method.

A shading layer applied on a glass substrate was applied was exposed to light in 500 mJ/cm² exposure light quantity from the application surface side by using a ultrahigh pressure mercury lamp. Then, the optical density was measured by using a Macbeth densitometer (trade name: TD-904, manufactured by Macbeth Corporation) (OD). The optical density of the glass substrate was measured in an equivalent method ($OD_0$). A value subtracting the value $OD_0$ from the value OD was adopted as the optical density of the film.

All samples were prepared such that such that the optical density is set to 3.6.

Formation of Blue, Red, and Green Pixels and Evaluation of Bubbles of Pixels

Pixels of each color were formed on a glass substrate on which a black matrix was formed by using samples R1, G1, B1 in Example-1 described in JP-A No. 2002-4341127. The method for forming pixels described in the Publication was used.

Since the pixels of each color were formed on the ruggedness of the black matrix, bubbles may be introduced between the glass substrate and the pixels of each color. The degree of the generation of the bubbles was measured in the following method.

The number of bubbles was visually counted in 100 pixels each of three colors of the glass substrate, that is, in 300 pixels in total by using an optical microscope.

Color Change of the Black Matrix by Heating

The hue change of a black matrix before and after heat-treating a glass substrate on which the black matrix was formed at 220° C. for 2 hours was visually evaluated.

| | |
|---|---|
| A | No hue change. |
| B | A little metal luster. |
| C | A little metal luster within a practically permissible range. |
| D | Metal luster within a practically damage range. |
| E | Complete metal luster. |

A, B and C are within a practically permissible range. Table 1 shows the above results.

TABLE 1

| Sample No | Photosensitive film thickness (μm) | Volume fraction | Optical density | Bubbles (piece) | Hue change |
|---|---|---|---|---|---|
| Comparative Example 1-1 | 2.9 | 0.02 | 3.6 | 50 or more | A |
| Example 1-1 | 0.80 | 0.08 | 3.6 | 12 | A |
| Example 1-2 | 0.35 | 0.21 | 3.6 | 2 | A |
| Example 1-3 | 0.18 | 0.39 | 3.6 | 0 | A |
| Example 1-4 | 0.13 | 0.52 | 3.6 | 0 | B |
| Example 1-5 | 0.11 | 0.63 | 3.6 | 0 | C |
| Comparative Example 1-2 | 0.10 | 0.73 | 3.6 | 0 | E |

Example 2

Preparation of the Shading Layer Coating Liquid

The preparation of the shading layer coating liquid was the same as that of Example 1.

Preparation of the Intermediate Layer Coating Liquid

The preparation of the intermediate layer coating liquid was the same as that of the protective layer coating liquid in Example 1.

| Preparation of the thermoplastic resin layer | |
|---|---|
| Methyl methacrylate/2-methyl hexylacrylate/benzil methacrylate/methacrylate = 54/12/5/29 copolymer (The composition ratio shows the mole ratio. The number average molecular weight = 80,000) | 58 part |
| Styrene/acrylate = 70/30 copolymer (The number average molecular weight = 7000) | 136 part |
| A compound obtained by dehydration condensation of an amount of 2 equivalence of octa ethylene glycol mono methacrylate and bisphenol A (plasticizer) (trade name: BPE-500, manufactured by Shin-Nakamura Chemical Co., Ltd.) | 90 part |
| Fluorine type surfactant (trade name: MEGAFAC F176PF, manufactured by Dainippon Ink And Chemicals, Incorporated) | 1 part |
| Methyl ethyl ketone | 541 part |
| 1-methoxy-2-propanol | 63 part |
| Methyl alcohol | 111 part |

The thermoplastic resin coating liquid was obtained by mixing the above components.

Preparation of the Transferring Material

A thermoplastic resin coating liquid was applied on a biaxially stretched polyethylene terephthalate support having the thickness of 75 μm by using a slide coater such that the thickness is set to 15 μm, and was dried at 100° C. for 5 minutes. An intermediate layer coating liquid was then applied thereon such that the dried film thickness is set to 1.5 μm, and was dried at 100° C. for 5 minutes. In addition, a shading layer coating liquid was applied thereon such that the optical density is set to 3.6, and was dried at 100° C. for 5 minutes.

Preparation of the Photosensitive Material

A glass substrate and a transferring material were laid such that the glass substrate is brought into contact with a shading layer, and both of them were laminated by using a laminater (trade name: VP-11, manufactured by Osaka Laminater Co., Ltd.). The lamination process was performed under the conditions of a pressure of 0.8 kg/cm$^2$ and a temperature of 130° C. Then, a polyethylene terephthalate support was exfoliated.

Preparation of the Black Matrix

The application surface side is exposed to light in 70 mJ/cm$^2$ exposure light quantity by using a ultrahigh pressure mercury lamp. Then, the following development processing was performed, and a black matrix was obtained.
(1) Alkali developer (trade name: development processing liquid TPD, manufactured by Fuji Photo Film Co., Ltd.) development processing (30° C., 40 seconds)
(2) Alkali developer (trade name: development processing liquid TCD, manufactured by Fuji Photo Film Co., Ltd.) development processing (33° C., 20 seconds)
(3) Alkali developer (trade name: development processing liquid TCD, manufactured by Fuji Photo Film Co., Ltd.) development processing (33° C., 20 seconds)

These samples were evaluated in the same manner as Example 1.

Table 2 shows the results.

TABLE 2

| Sample No | Photosensitive film thickness (μm) | Volume fraction | Optical density | Bubbles (piece) | Hue change |
|---|---|---|---|---|---|
| Comparative Example 2-1 | 3.1 | 0.02 | 3.6 | 50 or more | A |
| Example 2-1 | 0.88 | 0.07 | 3.6 | 8 | A |
| Example 2-2 | 0.28 | 0.23 | 3.6 | 3 | A |
| Example 2-3 | 0.19 | 0.39 | 3.6 | 0 | A |
| Example 2-4 | 0.13 | 0.53 | 3.6 | 0 | B |
| Example 2-5 | 0.12 | 0.61 | 3.6 | 0 | C |
| Comparative Example 2-2 | 0.11 | 0.73 | 3.6 | 0 | E |

Comparative Example 1

The black matrix of Comparative Example 1 was obtained in the same manner as in Example 1 except for changing the volume fraction of silver fine particles as shown in Table 1 by varying the addition amount of dipentaerithritol hexaacrylate. Table 1 shows the evaluation.

Comparative Example 2

The black matrix of Comparative Example 2 was obtained in the same manner as in Example 2 except for changing the volume fraction of silver fine particles as shown in Table 2 by varying the addition amount of dipentaerithritol hexaacrylate. Table 2 shows the evaluation.

The invention can provide a thin black matrix which has a high light-shielding performance and can be manufactured at a low cost, and in which no hue or the like is changed by heat treating at manufacturing.

What is claimed is:

1. A black matrix containing metal fine particles dispersed in a polymer, wherein a volume fraction of the metal fine particles is in a range from 0.05 to 0.70.

2. A black matrix according to claim 1, wherein the volume fraction of the metal fine particles is in a range from 0.10 to 0.55.

3. A black matrix according to claim 1, wherein the volume fraction of the metal fine particles is in a range from 0.2 to 0.50.

4. A method for manufacturing a black matrix comprising:
    forming a recording material having a layer and a temporary support, wherein the layer is formed by applying and drying a coating liquid containing metal fine particles on the temporary support; and
    transferring the layer onto a substrate,
    wherein a volume fraction of the metal fine particles contained in the black matrix obtained is in a range from 0.05 to 0.70.

5. A method for manufacturing the black matrix according to claim 4, wherein the volume fraction of the metal fine particles contained in the black matrix obtained is in a range from 0.10 to 0.55.

6. A method for manufacturing the black matrix according to claim 4, wherein the volume fraction of the metal fine particles contained in the black matrix obtained is in a range from 0.2 to 0.50.

7. A method for manufacturing the black matrix according to claim 4, wherein the coating liquid has photosensitivity, the layer is a photosensitive shading layer, and the recording material is a photosensitive transfer material.

8. A method for manufacturing the black matrix according to claim 4, wherein the temporary support is a thin sheet made of polyethylene terephthalate, polyethylene naphthalate, polyacrylate, polycarbonate, polyethylene or polypropylene, or made up of laminates selected from the group consisting thereof.

9. A method for manufacturing the black matrix according to claim 7, wherein an intermediate layer made of an alkali-soluble resin is disposed between the temporary support and the photosensitive shading layer.

10. A method for manufacturing a black matrix comprising applying and drying a coating liquid containing metal fine particles on or above a substrate,
    wherein a volume fraction of the metal fine particles contained in the black matrix obtained is in a range from 0.05 to 0.70.

11. A method for manufacturing the black matrix according to claim 10, wherein the volume fraction of the metal fine particles contained in the black matrix obtained is in a range from 0.10 to 0.55.

12. A method for manufacturing the black matrix according to claim 10, wherein the volume fraction of the metal fine particles contained in the black matrix obtained is in a range from 0.2 to 0.50.

13. A method for manufacturing the black matrix according to claim 10, wherein the coating liquid has photosensitivity.

14. A method for manufacturing the black matrix according to claim 10, wherein the substrate is a glass substrate.

* * * * *